United States Patent [19]
Ishida et al.

[11] Patent Number: 6,104,331
[45] Date of Patent: Aug. 15, 2000

[54] REPRODUCED SIGNAL PROCESSING METHOD, REPRODUCED SIGNAL PROCESSING CIRCUIT, AND A MAGNETIC STORAGE APPARATUS

[75] Inventors: Yoshiteru Ishida; Naoki Satoh, both of Odawara; Terumi Takashi, Chigasaki; Akihiko Hirano, Odawara; Seiichi Mita, Kanagawa-ken, all of Japan

[73] Assignee: Hitachi, Ltd., Tokyo, Japan

[21] Appl. No.: 09/161,734

[22] Filed: Sep. 29, 1998

[30] Foreign Application Priority Data

Sep. 30, 1997 [JP] Japan .................................. 9-265252

[51] Int. Cl.[7] .............................. H03M 1/12; G11B 5/02
[52] U.S. Cl. .............................................. 341/155; 360/55
[58] Field of Search ................................... 341/155, 144; 360/55, 67, 46, 68, 51

[56] References Cited

U.S. PATENT DOCUMENTS

| | | | |
|---|---|---|---|
| 4,914,398 | 4/1990 | Jove et al. | 328/167 |
| 5,057,785 | 10/1991 | Chung et al. | 328/162 |
| 5,089,757 | 2/1992 | Wilson | 318/560 |
| 5,233,482 | 8/1993 | Galbraith et al. | 360/46 |
| 5,559,772 | 9/1996 | Takeda | 369/44.36 |
| 5,847,890 | 12/1998 | Hattori | 360/51 |

FOREIGN PATENT DOCUMENTS

| | | |
|---|---|---|
| 6-28785 | 2/1994 | Japan . |
| 7-86964 | 9/1995 | Japan . |

*Primary Examiner*—Peguy JeanPierre
*Attorney, Agent, or Firm*—Antonelli, Terry, Stout & Kraus, LLP

[57] ABSTRACT

A reproduced signal processing circuit includes a variable gain amplifier to which a signal read from a medium by a reproducing head is inputted; an analog-to-digital converter for converting a signal outputted from the variable gain amplifier into a digital signal; and a variable frequency oscillator for supplying an operation clock signal to the analog-to-digital converter. A reproduced signal processing method includes the steps of operating a first control loop for controlling the variable gain amplifier; operating at least either one of a second control loop and a third control loop, the second control loop controlling the variable frequency oscillator, the third control loop controlling the variable frequency oscillator; filtering by analog filter means the read signal inputted to the variable gain amplifier; operating at least one of first, second, and third noise detecting operations, the first noise detecting operation detecting presence or absence of a noise by comparing an amplitude of the output signal from the variable gain amplifier with a predetermined threshold value, the second noise detecting operation detecting a noise during an operation period of the second control loop, the third noise detecting operation detecting a noise during an operation period of the third control loop; and changing the range of cutoff frequency of the analog filter means in accordance with a result from at least one of the first, second, and third noise detecting operations, thereby controlling at least one of the first, second, and third control loops.

27 Claims, 8 Drawing Sheets

REPRODUCED SIGNAL PROCESSING METHOD, REPRODUCED SIGNAL PROCESSING CIRCUIT, AND A MAGNETIC STORAGE APPARATUS

BACKGROUND OF THE INVENTION

The present invention relates to a reproduced signal processing technology and a magrnetic recording technology, and in particular, to a reproduced signal processing technology and a magnetic recording technology which are highly resistive in a data signal region against noises and the like associated with reduction in amplitude of the reproduced signal and the like due to thermal asperity and defects on a disk medium which are problems in a narrow spacing operation in a magnetic disk unit or the like using a magnetoresistive (MR) head as its reproducing head.

Figure 7:
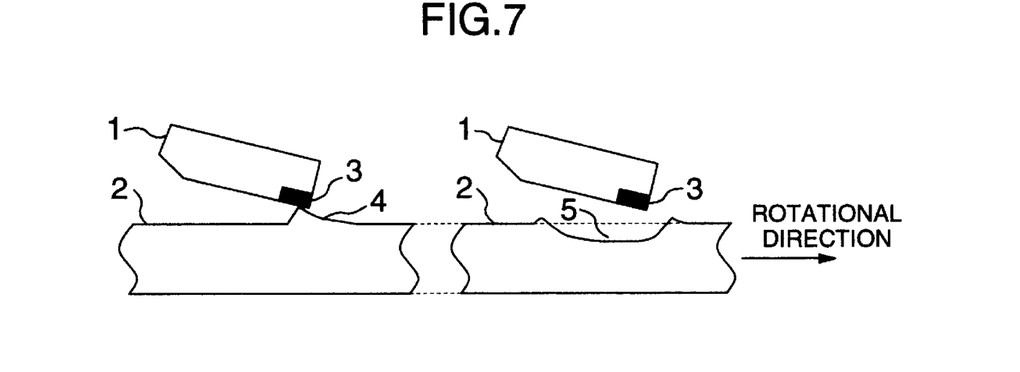
FIG. 7 is a schematic diagram showing an example of an interface section of a magnetic head and a magnetic disk in a general magnetic disk unit.
Figure 8:
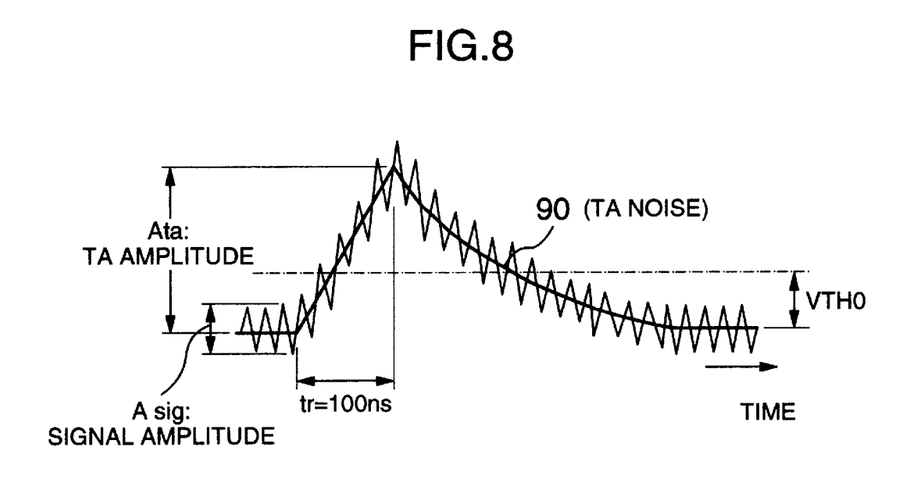
FIG. 8 is a graph showing an example of variation in an envelope of reproduced signals caused by thermal asperity.
Figure 9:
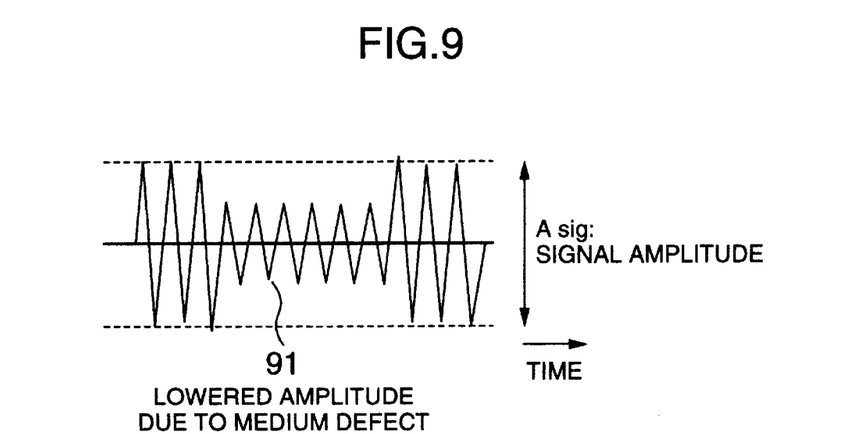
FIG. 9 is a graph showing an example of amplitude reduction in a reproduced signal due to a medium defect.

FIG. 7 shows constitution of an interface section of magnetic heads 1 and 2 of a magnetic disk unit. As a reproducing head 3, a magnetoresistive head is used in this configuration. The MR head 3 is a thin film head in which a thin film element having magnetoresistance effect is used as a sensor. When spacing between the MR head and the disk becomes small, there may occur a case in which, for example, the MR head 3 is brought into contact with a small projection of the disk and hence the value of resistance of the MR head varies due to heat generated by friction therebetween. It has been known that this leads to thermal asperity (TA) in which an envelope of the signal considerably undulates or deforms due to the change in the resistance value as shown in FIG. 8. A magnitude (Ata) of thermal asperity possibly becomes equal to or more than that of a signal amplitude (Asig). Therefore, when there appears thermal asperity, the data reproducing performance is fatally damaged. Furthermore, when a small defect (peeling of a magnetic film or the likes) 5 exists on a disk medium in FIG. 7, the amplitude of the signal is lowered as shown in FIG. 9, and signals are lost in worst situations depending on cases. Consequently, presence of a defect on the medium possibly exerts a fatal influence onto the data reproducing performance.

Figure 10:
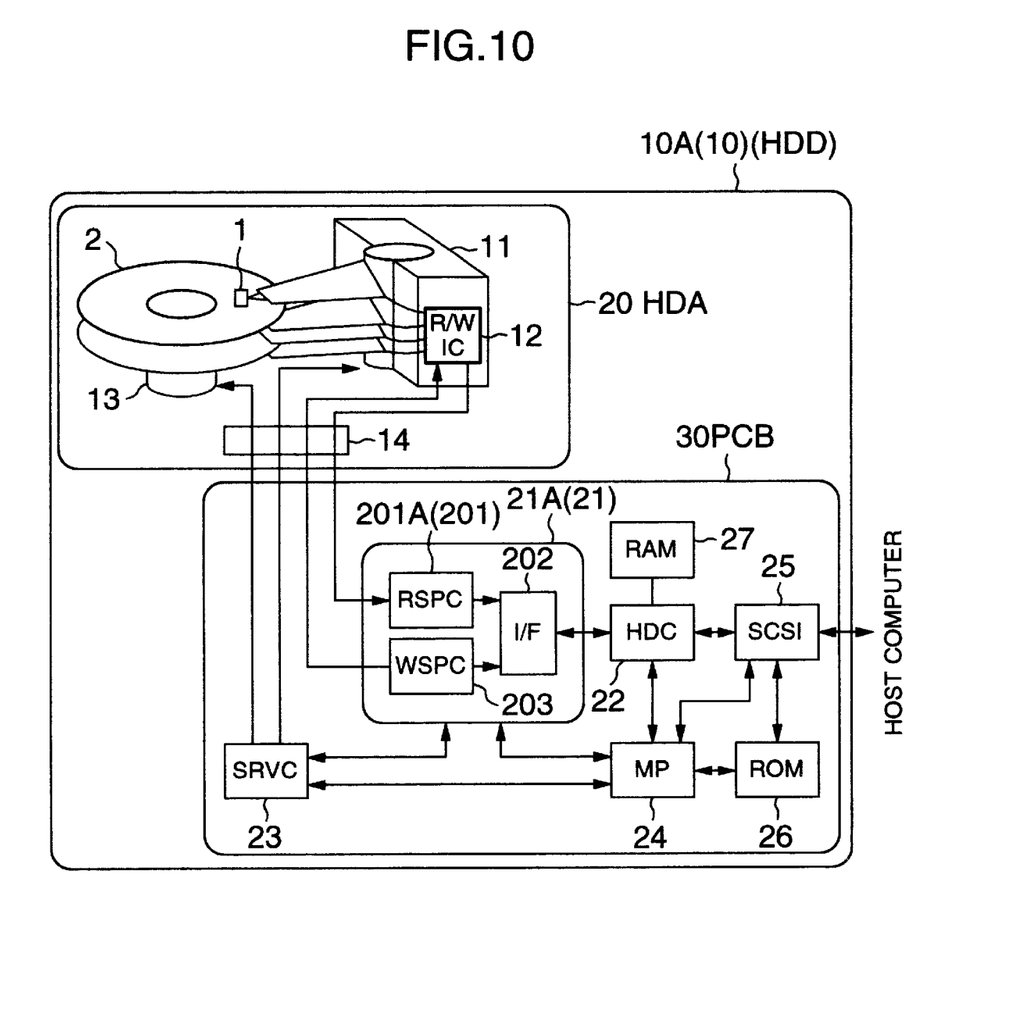
FIG. 10 is a conceptual diagram showing an example of constitution of a magnetic disk unit.

FIG. 10 shows an example of constitution of a magnetic disk drive (HDD) 10. The HDD 10 includes a head disk assembly (HDA) 20 including a magnetic disk 2, a magnetic head 1, a carriage 11, a read/write IC 12 mounted on the carriage 11, a spindle motor 13, and a flexible package (FPC) 14 on which signal paths are printed and a package board (PCB) 30 including a signal processing LSI (SPC) chip 21, a hard disk controller (HDC) 22, a servo controller (SRVC) 23, a microprocessor (MP) 24, an SCSI chip 25, a read-only memory (ROM) 26, and a random access memory (RAM) 27.

Description will now be given of a flow of a data reproduced signal. The reproduced signal from the MR head 3 is amplified by a pre-amplifier of an MR head in the read/write integrated circuit chip (R/W IC) 12 on the carriage 11 and is fed through a pattern wiring on the FPC 14 to be inputted to the package board (PCB) 30. This signal is inputted to a reproducing circuit (RSPC) 201 in the signal processing LSI (SPC) chip 21. The reproducing circuit 201 discriminates the reproduced signal to resultantly output digital data via an interface circuit 202 to the hard disk controller (HDC) 22. The HDC 22 includes therein an error correction circuit (ECC) to correct any error in the reproduced data inputted from the SPC 21, and if necessary, the HDC 22 retries the data reproduction. The reproduced data outputted from the HDC 22 is outputted via the SCSI chip 25 to the host computer. Incidentally, 202 indicates an interface circuit (IF) for the HDC 22 and 203 denotes a recording circuit (WSPC) including a modulating circuit or an encoder and the like.

Figure 11:
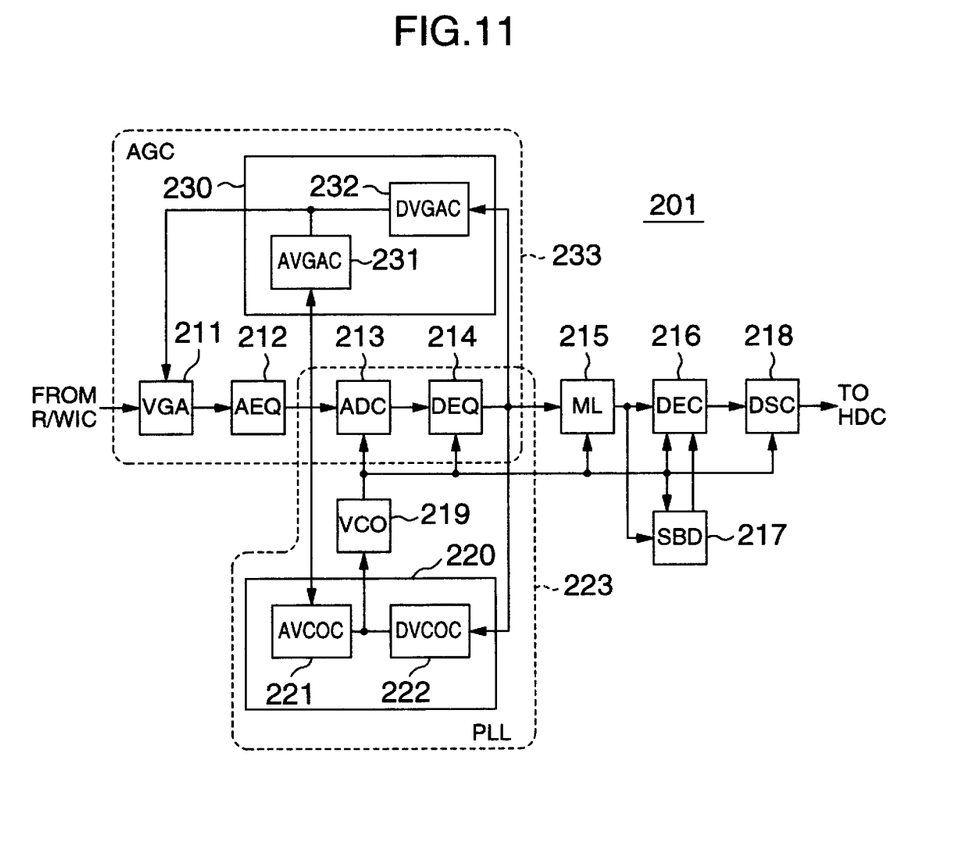
FIG. 11 is a block diagram showing an example of structure of a reproducing circuit in a magnetic disk unit of the prior art.

FIG. 11 shows an example of structure of the reproducing circuit (RSPC) 201. Applied to this example is a data signal processing technology of "partial response+maximum likelihood decoding (PRML)" or "extended partial response+ maximum likelihood decoding (PRML)". The example of the signal processing circuit includes a variable gain amplifier (VGA) 211, an analog equalizer (AEQ) 212 having a low-pass filter characteristic and a high-pass boost characteristic, an analog-to-digital (A/D) converter (ADC) 213, a digital equalizer (DEQ) 214, a maximum likelihood detector (ML) 215, a sync byte detector (SBD) 217, a decoder (DEC) 216, and a de-scrambler (DSC) 218; a variable gain amplifier controller (VGC) 230 for controlling a gain of the VGA 211 at data reproduction, a voltage controlled oscillator (VCO) 219 for supplying a sampling clock signal to the ADC, and a VCO controller (VCOC) 220. In this example, reproduced data is outputted to the HDC 22.

The VGAC 230 includes in many cases an analog VGAC (AVGAC) 231 which detects an amplitude of the analog output signal from the AEQ 212 and controls the gain of the VGA 211 to bring the amplitude close to a target amplitude at a high speed and a digital VGAC (DVGAC) 232 which controls the gain of the VGA 211 to bring digital data outputted from the DEQ 214 close to a target value so that the digital data follows the target value.

The VCOC 220 includes an analog TCOC (AVCOC) 221 which compares a phase and a frequency of a pulse generated from the analog output signal from the AEQ 212 with those of the sampling clock signal from the VCO 219 to conduct a high-speed capturing so as to establish synchronization of the frequency and the phase between the sampling clock signal and the analog output signal and a digital VCOC (DVCOC) 222 which detects a phase difference from digital data outputted from the DEQ 214 to minimize the phase difference. Alternatively, the VCOC 220 includes only a DVCOC 222 depending on cases. In the explanation below, a closed loop including the VGA211, AEQ 212, ADC 213, DEQ 214, and VGAC 230 is referred to as an automatic gain control (AGC) loop 233. Additionally, a closed loop including the VCO 219, ADC 213, DEQ 214, and VCOC 220 is referred to as a phase locked loop (PLL) 223.

Operation of the reproducing circuit (RSPC) 201 will be described. The VGA 211 receives as its input a signal amplified by the R/W IC 12 to a certain amplitude and amplifies the input signal to obtain an output signal so as to bring an amplitude of the output signal close to a target amplitude in an input to the maximum likelihood detector (ML) 215. In this operation, the VGAC 230 controls the VGA 211. The AEQ 212 receives as its input an output signal from the VGA 211 to conduct removal of noise in an unnecessary band, a pre-equalization, and the like. The ADC 213 converts the analog output signal from the AEQ 212 into a digital signal. In this case, the sampling clock of the ADC 213 is controlled such that a sequence of sample signal values of the input to the ML detector 215 is within a target amplitude. For this purpose, the VCOC 220 controls the control voltage of the VCO 219. The DEQ 214 conducts waveform equalization for the output data from the ADC 213 so that the ML detector 215 easily discriminates signals. The ML deflector 215 discriminates high-level and low-level signals of output data from the DEQ 214 to produce binary data. When the SBD 217 detects a sync byte indicating a start point of data in the output data from the ML detector 215, the DEC 216 decodes the data beginning at the point. The data is de-scrambled by the DSC 218 and then undergoes; a serial-to-parallel conversion, and resultant user data is outputted to the HDC 22.

When a signal waveform including thermal asperity is inputted to the reproducing circuit (RSPC) 201, there possibly occur two kinds of data errors. First, the signal waveform itself varies or deforms and hence a data discrimination error is detested in the ML detector 215. Primary reasons for the variation in the signal waveform are as follows. A signal exceeding a dynamic range due to thermal asperity is inputted to the A/D converter 213 and the output therefrom saturates in either one of the polarity directions (i.e., positive or negative side), which prevents the waveformn equalization in the digital equalizer 214. The data discrimination error can be recovered by increasing the correction performance of the error correction circuit (ECC) in the hard disk controller 22 of FIG. 10 to enable an error correction of data having a longer data length. Simultaneously, the error can be saved or recovered by decreasing the period for the saturation in the A/D converter 213 due to thermal asperity to shorten the data error length to a range in which the ECC can correct the data error. Second, the AGC and PLL loops become out of order in operation and hence there occurs a data burst error. Main reasons for the disorder in operation of the AGC and PLL loops are as follows. The control quantities of the VGAC 230 and the VCOC 220 are disturbed for a long period of variation in the envelope of waveform due to thermal asperity and hence wrong control quantities are fed back to the VGA 211 and the VCO 219. Specifically, the control quantities are fed back thereto such that the VGAC 230 controls the amplitude to be reduced and the VCOC 220 controls the frequency to be lowered so as to delay the phase. The data burst error possibly leads to a long error length and the error cannot be corrected by the ECC; moreover, the data cannot be recovered through the correction retry in some cases, leading to a device failure. Consequently, there is essentially required to take a countermeasure against thermal asperity to keep the normal operation in the AGC and PLL loops.

Next, when a signal waveform having an amplitude reduced by a medium defect is inputted to the reproducing circuit (RSPC) 201, there also take place two kinds of data errors as in the case of thermal asperity. First, the signal waveform itself varies and hence a data discrimination error is detected by the ML detector 215. This error can be recovered by increasing the correction performance of the error correction circuit in the hard disk controller 22 of FIG. 10. Second, the AGC and PLL loops become out of order in operation and hence a data burst error occurs. Main reasons for the disorder in the AGC and PLL loops are as follows. The control quantities of the VGAC 230 and the VCOC 220 are disturbed during a period in which the signal amplitude is lowered and wrong control quantities are fed back to the VGA 211 and the VCO 219. Specifically, the control quantities are fed back thereto such that the VGAC 217 increases the amplitude and the VCOC 220 decreases the frequency to delay the phase. The data burst error possibly leads to a long error length and the error cannot be corrected by the ECC. Moreover, the data cannot be recovered through the correction retry in some cases, leading to a device failure. Consequently, there is essentially required to take a countermeasure against the decrease in the signal amplitude due to a medium defect to keep the normal operation in the AGC and PLL loops.

Description will now be given of an example of a thermal asperity compensation method and operation in accordance with the prior art. The prior art has been described in, for example, U.S. Pat. No. 4,914,398, JP-B-7-86964, and JP-A-6-28785.

In short, in accordance with U.S. Pat. No. 4,914,398 and JP-B-7-86964, there is disclosed a first method in which a noise due to thermal asperity is detected by an analog circuit procedure such that the noise is subtracted from a reproduced signal to thereby removing on the fly the noise related to thermal asperity.

Additionally, in accordance with JP-A-6-28785, there is disclosed a second method in which when conducting a retry for a data read error, thermal asperity is detected in accordance with the number of saturated samples in the A/D converter to minimize the target amplitude of the digital equalizer so as to prevent saturation in the A/D converter. Namely, the cutoff frequency of the low band is increased in the reproducing circuit to shorten the period of influence of the noise due to thermal asperity; moreover, the AGC and PLL loops are held at the same time.

However, in the first method, the analog circuit becomes very great in size; moreover, in operation of the removal circuit, the performance is deteriorated by a noise generated by the removal circuit. In the second method, the operation cannot be conducted on the fly and hence the performance of the apparatus inevitably occurs when thermal asperity appears.

Moreover, when the AGC and PLL loops have a high loop gain, the control quantities of the VGAC 230 and the VCOC 220 are considerably disturbed during a period of several bits from when thermal asperity occurs to when the thermal asperity detector holds the AGC and PLL loops. Even when the noise due to thermal asperity is removed, the AGC and PLL cannot be put to a desired operation and there may occur a burst error. The prior art has no concern about a thermal asperity but also about a problem in which the waveform having a signal amplitude lowered due to a medium defect, not only by thermal asperity, cannot be coped with.

SUMMARY OF THE INVENTION

It is therefore an object of the present invention to provide a reproduced signal processing technology in which influence of thermal asperity and amplitude reduction can be removed from a reproduced signal onto which a noise due to thermal asperity or the like is superimposed and/or a reproduced signal having an amplitude lowered due to a medium defect by a relatively small-sized circuit.

Another object of the present invention to provide a reproduced signal processing technology in which presence or absence, timing, and the like of occurrence of noises are notified to an external device to thereby achieve various control operations, improvement of error correction performance, and reliability, and the like.

Another object of the present invention to provide a magnetic storage technology in which influence of noises such as thermal asperity and amplitude reduction can be removed from a reproduced signal onto which a noise due to thermal asperity or the like is superimposed and/or a reproduced signal having an amplitude lowered due to a medium defect by a relatively small-sized circuit.

Another object of the present invention to provide a magnetic storage technology in which presence or absence, timing, and the like of occurrence of noises due to thermal asperity and/or a medium defect are notified to an external device to thereby achieve various control operations, improvement of error correction performance and reliability, and the like.

To achieve the above object in accordance with the present invention, there is provided reproduced signal processing circuit and a reproduced signal processing method in which the reproduced signal processing circuit includes a variable gain amplifier to which a signal read from a medium is inputted, an analog-to-digital (A/D) converter for converting a signal outputted from the variable gain amplifier into a digital signal, and a variable frequency oscillator for supplying an operation clock signal to the A/D converter. There is operated a first control loop for controlling the variable gain amplifier in accordance with at least either one of the analog reproduced signal according to an output signal from the variable gain amplifier and the digital reproduced signal corresponding to an output signal from the A/D converter. There is also achieved at least either one of a second control loop and a third control loop, the second control loop controlling the variable frequency oscillator in accordance with the analog reproduced signal corresponding to an output signal from the variable gain amplifier, the third control loop controlling the variable frequency oscillator in accordance with the digital reproduced signal corresponding to an output signal from the A/D converter. An operation is conducted by an analog filter unit to filter the read signal inputted to tile variable gain amplifier, the analog filter unit having a cutoff frequency range variable for a signal inputted thereto. There is conducted at least one of first, second, and third noise detecting operations, the first noise detecting operation detecting presence or absence of a noise by comparing an amplitude of the output signal from the variable gain amplifier with a predetermined threshold value, the second noise detecting operation detecting a noise during an operation period of the second control loop, the third noise detecting operation detecting a noise during an operation period of the third control loop. The range of cutoff frequency of the analog filter unit is changed in accordance with a result from at least one of the first, second, and third noise detecting operations so as to control at least one of the first, second, and third control loops.

In accordance with the present invention, there is provided a magnetic storage apparatus having a magnetic storage medium, a reproducing head for reading information from the magnetic storage medium, and a reproduced signal processing circuit coupled with the reproducing head. The reproduced signal processing circuit includes a variable gain amplifier for controlling an amplitude of a read signal supplied from the reproducing head thereto, an analog-to-digital (A/D) converter for converting a reproduced signal outputted from the variable gain amplifier into a digital signal, a variable frequency oscillator for generating a sampling clock signal of the A/D converter, a first control loop for bringing in accordance with at least either one of the analog reproduced signal corresponding to an output signal from the variable gain amplifier and the digital reproduced signal corresponding to an output signal from the A/D converter an amplitude of the analog reproduced signal close to a desired target value, at least either one of a second control loop and a third control loop, the second control loop bringing a phase of a sampling clock signal of the variable frequency oscillator to a target phase in accordance with the analog reproduced signal corresponding to an output signal from the variable gain amplifier, the third control loop bringing a phase of a sampling clock signal of the variable frequency oscillator to a target phase in accordance with the digital reproduced signal corresponding to an output signal from the A/D converter; at least one of first, second, and third noise detecting units, the first noise detecting unit detecting presence or absences of a noise by comparing an amplitude of an output signal from the variable gain amplifier with a predetermined threshold value, the second noise detecting unit detecting a noise during an operation period of the second control loop, the third noise detecting unit detecting a noise during an operation period of the third control loop; an analog filter unit disposed in a stage before the variable gain amplifier, the analog filter unit having a cutoff frequency range variable for changing a signal inputted thereto; a control unit for changing, in accordance with a noise detection result from at least one of the first, second, and third noise detecting unit, a cutoff frequency range of a high-pass characteristic of the analog filter unit for a data region of the reproduced signal at a desired rate with respect to a Nyquist frequency in the sampling of the reproduced signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

In accordance with the present invention, attention is paid to that thermal asperity is a noise of a relatively low frequency which takes substantially a maximum amplitude about 100 nanoseconds (ns) after occurrence thereof as shown in FIG. 8. When thermal asperity is detected in a data region, the cutoff frequency of the high-pass characteristic is increased to about ¼ to about ⅛ of a frequency of a PLOSYNC signal (having a fixed pattern, e.g., repetition of "1, 1, −1, −1" to bring the AGC and PLL loops close to the target amplitude and phase) to thereby remove thermal asperity so as to reduce the period of saturation in the A/D converter. Moreover, the signal having an amplitude lowered due to thermal asperity and/or a medium defect is detected for each period of operation of the AVCOC and the DVCOC which control the VCO so as to thereby preventing disturbance in the control quantity of the VCO. Additionally, when thermal asperity is detected before a read gate (RG) indicating a data read start point is asserted, the control operation is carried out to increase the gain of the VGA to set thus signal amplitude to a larger value. In this connection, the term "TA detection" employed in this specification indicates, in addition to detection of thermal asperity, detection of a noise of amplitude reduction due to a medium defect.

Specifically, there are employed following methods.

First, a magnetic disk unit having a magnetoresistive head as its reproducing head includes an analog filter unit capable of setting in a change-over manner a cutoff frequency (fc) of the high-pass characteristic at least in a data region to a value (fc≈0.02*fplo) equal to about 0.02×PLOSYNC signal frequency (fplo) and to a value (fc≈0.1*fplo) equal to at least about 0.1×PLOSYNC signal frequency (fplo) in accordance with presence or absence of detection of thermal asperity. The head includes a first TA detecting unit for detecting thermal asperity by comparing an amplitude of the output from the VGA with a threshold value for determination of thermal asperity, a second TA detecting unit for detecting thermal asperity during operation of the AVCOC, and a third TA detecting unit for detecting thermal asperity during operation of the DVCOC. Thanks to this configuration, at occurrence of thermal asperity, it is possible to minimize the period of variation of the envelope due to thermal asperity to thereby prevent the saturation in the ADC. Moreover, when thermal asperity is absent, the cutoff frequency can be set to an appropriate value to cope with thermal asperity on the fly with the ordinary reproducing performance kept retained. Additionally, due to the second and third TA detecting units, thermal asperity having a small delay can be detected with a high precision. The cutoff frequency of the high-pass characteristic of the analog filter may be set to a frequency substantially equal to 0.01×Nyquist frequency in the sampling of the reproduced signal or to at least a frequency substantially equal to 0.05×Nyquist frequency in the sampling of the reproduced signal.

Second, in the second TA detecting unit, the signal during operation of the AVCOC is the PLOSYNC signal and the polarity of the peak of waveform alternately appears is used such that when the alternate sequence of peaks is successively disordered for four or more samples and there consecutively occur positive or negative outputs as a result of level slicing of waveforms, thermal asperity is assumed. With the provision, a case of peak loss due to a random noise and a case of a signal having an amplitude lowered by a medium defect can be detected as other than an event of thermal asperity, and hence thermal asperity can be detected with a higher precision.

Third, there is included, in addition to a register to which a threshold value or level of the first TA detecting unit is set, a register to which a threshold value for the level slicing of waveforms is set for the second TA detecting unit. Thanks to the structure, thermal asperity can be detected with a higher precision.

Fourth, the third TA detecting unit assumes presence of thermal asperity in accordance with data outputted from the ADC during an operation period of the DVCOC when three or more samples are saturated with the same polarity in eight samples and there exists no saturated sample with the opposite polarity. Thanks to this operation, a case of a large amplitude of the input signal to the ADC and a case of saturation due to a random noise can be detected as other than an event of thermal asperity, and hence thermal asperity can be detected with a higher precision.

Fifth, when the response of the AGC loop is set such that a shorter period is required to bring the larger amplitude close to the target amplitude and a longer period is required to bring the smaller amplitude, the second TA detecting unit is controlled to increase the signal amplitude by the VGA during a period of occurrence of missing peaks in other than the operation period of the DVCOC. With the provision, the control operation to reduce the amplitude by the VGA at occurrence of thermal asperity can be stopped and the data error in the recovery time of the signal amplitude can be removed. Additionally, it is possible to prevent an event in which when thermal asperity occurs before the RG is asserted, the signal amplitude is narrowed and the AGC and PLL loops cannot be set to the target state and hence a sector error occurs due to impossibility of detection of the sync byte. This consequently makes it possible to read data.

Sixth, there is produced at least a logical sum of the outputs from the TA detecting units to output the result to a register or a lead pin of an LSI chip. Thanks to this provision, the error detection performance is improved and reliability of the device is increased, for example, by use of an alternate sector.

Seventh, there is included a DVCOC in which an abnormality of the input data pattern of the DVCOC is detected through a hard decision and the control output is forcibly set to "0" for an abnormal signal. With the provision, during the operation period of the DVCOC, the control operation of the VCO can be held at a high speed even without the control signal from the TA detecting circuit.

Referring now to the drawings, description will be given in more detail of an embodiment in accordance with the invention. Incidentally, as an example of the magnetic storage unit, a magnetic disk including a magnetoresistive head is used in the following description.

Thermal asperity is a noise of a relatively low frequency having a maximum amplitude about 100 ns after occurrence thereof, and its frequency component is at most of several megaherz (MHz). Therefore, when thermal asperity is detected in the data region, if the high-pass characteristic can be set to several megaherz or more, it can be said that most frequency components of thermal asperity are removed. However, when the low-frequency components are excessively removed, the inherent low-frequency components of the signal are also removed and hence the waveform is distorted. Consequently, it is required to select an appropriate cutoff frequency. For example, in a case of a data transfer spaced of 200 megabits per second, when the data reproduction is associated with a signal band from about 1 MHz to 150 MHz, a signal band is narrowed to range from 6 MHz to 100 MHz for the TA detection. In this situation, since the PLOSYNC signal has a frequency of 50 MHz, the cutoff frequency of the high-pass characteristic is considered to be about ⅛ of the PLOSYNC frequency. This is equivalent to that the cutoff frequency of the high-pass characteristic of the analog filter is set to a frequency equal to 0.01×Nyquist frequency and to a frequency equal to 0.05×Nyquist frequency in the sampling of reproduced signal. With the provision, the undulation of the waveform envelope due to thermal asperity can be suppressed in a short period of time and the data error length is minimized.

Figure 1:
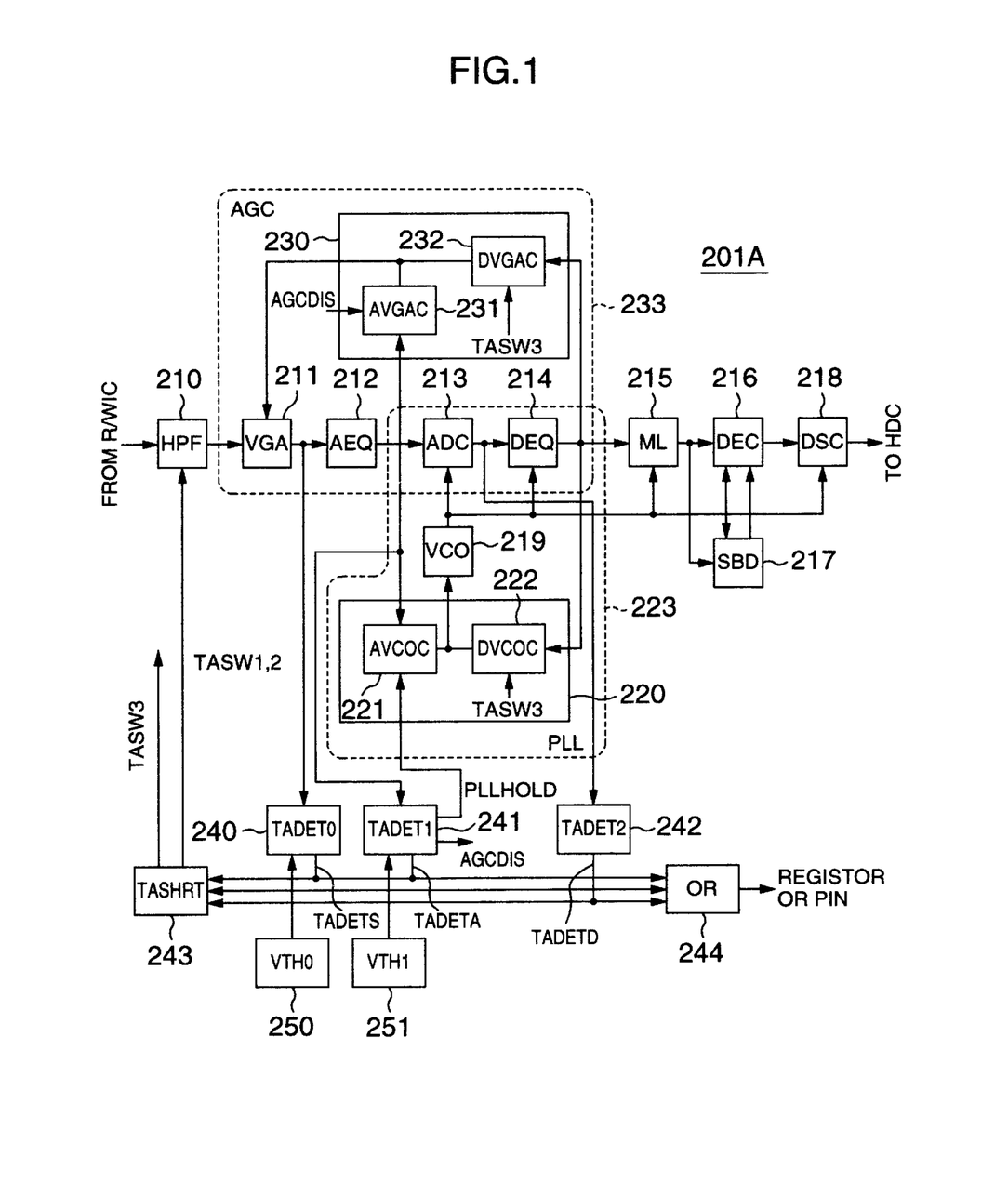
FIG. 1 is a block diagram showing an overall configuration of a reproducing circuit as an example of a reproduced signal processing circuit disposed in a magnetic disk unit in an embodiment in accordance with the present invention.

FIG. 1 shows an overall configuration of a reproducing circuit (RSPC) 201A as an example of a reproduced signal processing circuit included in a magnetic disk unit in an embodiment the present invention. The magnetic disk unit 10A in the embodiment of the invention excepting the RSPC 201A is configured in the same fashion as for FIG. 10 showing an available prior art and there is configured a signal processing LSI (SPC) 21A. As in the prior art, there is adopted the signal processing technology of "partial response+maximum likelihood decoding (PRML)" or "extended partial response+maximum likelihood decoding (EPRML)". For either signal processing technologies or for a further extended signal processing technology, this present invention can be consequently applied without any problem and regardless of the signal processing technologies.

The reproducing circuit (RSPC) 201A in the embodiment differs from the configuration shown in FIG. 11 that there are additionally included a high-pass filter (HPF) 210 disposed in a stage before the VGA 211, a first TA detecting circuit (TADET0) 240 to detect presence or absence of occurrence of thermal asperity in accordance with an output from the VGA 211, a second TA detecting circuit (TADET1) 241 to detect presence or absence of occurrence of thermal asperity in accordance with an output from the AEQ 212, a third TA detecting circuit (TADET2) 242 to detect presence or absence of occurrence of thermal asperity in accordance with an output from the ADC 213, an HPF control Circuit (TASHRT) 243 which outputs at detection of thermal asperity the control signals TASW1 and TASW2 to change the cutoff frequency of the HPF 210 and which outputs TASW3 as a control signal of the DVCOC 222 and the DVGAC 232, and an OR circuit 244 to gather TA detection results from a plurality of TADET0 to TADET2 so as to output the obtained signal to a register or a pin.

Another different point resides in that the AVGAC 231 is masked by an AGCDIS signal outputted from the TADET 1, AVCOC 221 is masked by a PLLHOLD signal from the TADET 1, and the DVGAC 232 and DVCOC 222 are both masked by a TASW3 signal from the TASHRT 243 such that each of the control output signals respectively thereof is set to "0".

In this connection, the TASW3 signal is asserted (i.e., is set to on) by the TASHRT 243 when the logical condition of "TADET0 & RG"+TADET2 is satisfied. In the expression, symbols "&" and "+" respectively indicates a logical product operation and a logical sum operation.

Threshold values VTH0 and VTH1 for the level slicing of waveforms are respectively inputted from registers 250 and 251 to the TADET0 240 and TADET1 241. In this case, when the VCO 219 is controlled only by the DVCOC 222 in the PLL loop 223 and the AVCOC 221 is absent, the TADET1 241 need only have a function to produce the AGCDIS signal.

Figure 2:
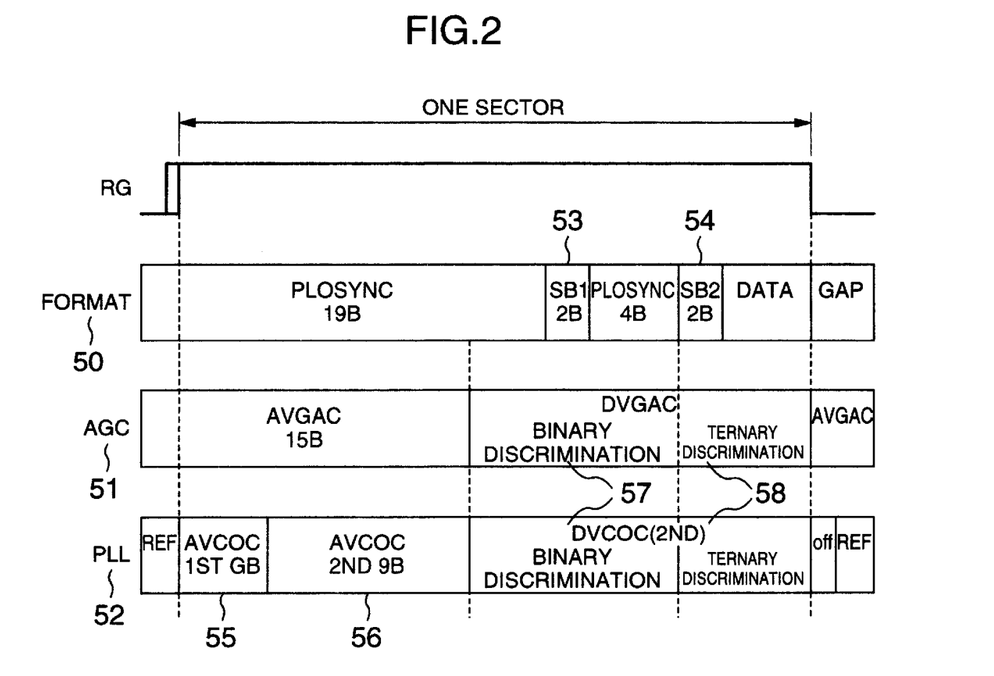
FIG. 2 is a conceptual diagram showing an example of a data format and a relationship between control operations of AGC and PLL loops in disposed in a magnetic disk unit in an embodiment in accordance with the present invention.

FIG. 2 shows a data format and a control operation of the AGC and PLL loop in the present embodiment. Two sync bytes SB1 53 and SB2 54 are included in a format 50 for the following reasons. Even when a signal having an amplitude lowered due to thermal asperity and/or a medium defect is associated with the sync byte, the SBD 217 conducts a double ambiguity detection for the sync byte to enable the sync byte detection so as to minimize the chance of sector errors. Additionally, AVCOC-1st 55 and AVCOC-2nd 56 in a PLL 52 indicate that the AVCOC 221 is controlled respectively by a first order system and a second order system. In an AGC 51 and a PLL 52, binary-discrimination 57 and ternary-discrimination 58 of the DVGAC and the DVCOC respectively indicates that in the amplitude comparison by the AGC in accordance with a difference with respect to an expected value, the discrimination is made by a binary value representing positive or negative and by a tertiary value representing "the pertinent value is more than a positive threshold value", "the pertinent value is less than a negative threshold value", or "the pertinent value is between the positive and negative threshold values". It is assumed that in the amplitude comparison by the PLL 52 in accordance with a difference with respect to an expected value, the discrimination is carried out in the same way as for the AGC 51.

Figure 3:
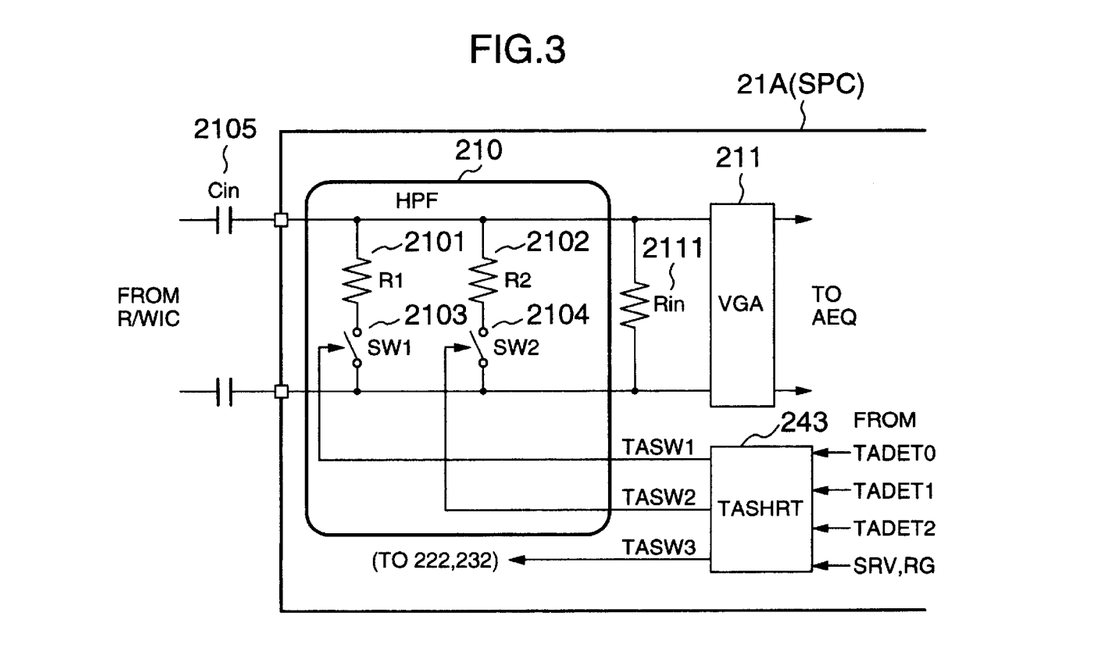
FIG. 3 is a conceptual diagram showing an example of structure of a high-pass filter disposed in a reproduced signal processing circuit arranged in a magnetic disk unit in an embodiment in accordance with the present invention.

FIG. 3 shows constitution of the HPF in the present embodiment. In parallel with an input register Rin 2111, a register R1 2101 and a switch SW1 2103 as well as a register R2 2102 and a switch SW2 2104 are arranged in an input stage of the VGA 211. On and off operations of the SW1 2103 and the SW2 2104 are controlled by the TASW1 and TASW2 outputted from the TASHRT 243. The high-pass frequency is substantially determined by a combination of a coupling capacitor Cin 2105 and the registers R1 2101, R2 2102, and Rin 2111 in the input section, and the circuit system is so configured that the cutoff frequency is 6 MHz at detection of thermal asperity. Concretely, Cin=56 pF, R1=315 ohm, R2=473 ohm, and Rin is 7 kiloohm to set these values to about 6 MHz and about 15 MHz. Incidentally, although the configuration includes a single-input structure for simplicity of explanation, there is actually employed a differential input. Table 1 shows control signals and their generating conditions in the TASHRT 243 and the HPF 210.

TABLE 1

Setting and conditions of HPF cutoff frequency of the present invention

| SW1 | SW2 | fc (MHz) | Condition |
| --- | --- | --- | --- |
| off | off | 1 | SRV = "L"&(TADET0 + TADET1 + TADET2) = "L" |
| off | on | 6 | RG = "H"&(TADET0 + TADET1 + TADET2) = "H" |
| on | off | 9 | don't use |
| on | on | 15 | SRV = "H" |

&* Logical product operation
+* Logical sum operation

In the present embodiment, thermal asperity in the servo period is coped with by increasing the cutoff frequency of the high-pass frequency to 15 MHz during the servo period. Moreover, the TASHRT 243 outputs, in response to a trigger which is a TA detection result from the TADET0, TADET1, and TADET2, a one-shot pulse having a fixed time length (of at most about 3.2 microseconds) as a control signal to the HPF 210. Since the TA component is removed by the passive circuit in the first-most stage of the RSPC 201A, it is unnecessary for the VGA 211 and AEQ 212 in the preceding stage to give consideration to the increase in the input dynamic range and the like for thermal asperity.

Figure 12:
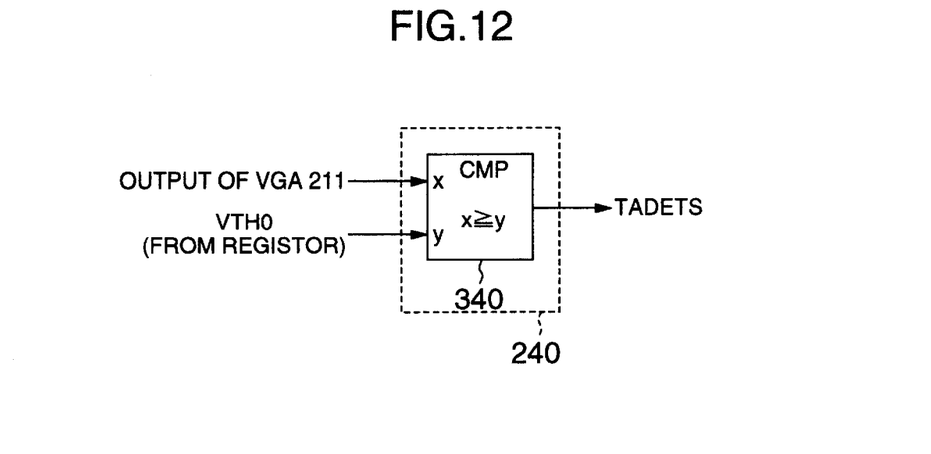
FIG. 12 is a block diagram showing a first TA detecting circuit TADET0 used in the reproduced signal processing circuit of FIG. 1.

For a threshold value VTH0 (stored in the register 250) used by the TADET0 240, there is selected a value larger a predetermined value than the normal signal amplitude Asig shown in FIG. 8 and the selected value is set to a predetermined register of the RSPC 201A. Under this condition, the TADET0 240 compares by a comparator 340 shown in FIG. 12 the VTH0 set to the register with an output waveform of the VGA 211 before the waveform equalization, for example, as shown in FIG. 8. When it is detected that the output waveform remarkably varies due to occurrence of thermal asperity as indicated by TA amplitude Ata and exceeds VTH0, the TADET0 240 assumes occurrence of thermal asperity and then asserts a logical signal TADETS to notify the condition to the TASHRT 243 and the OR circuit 244.

Figure 4:
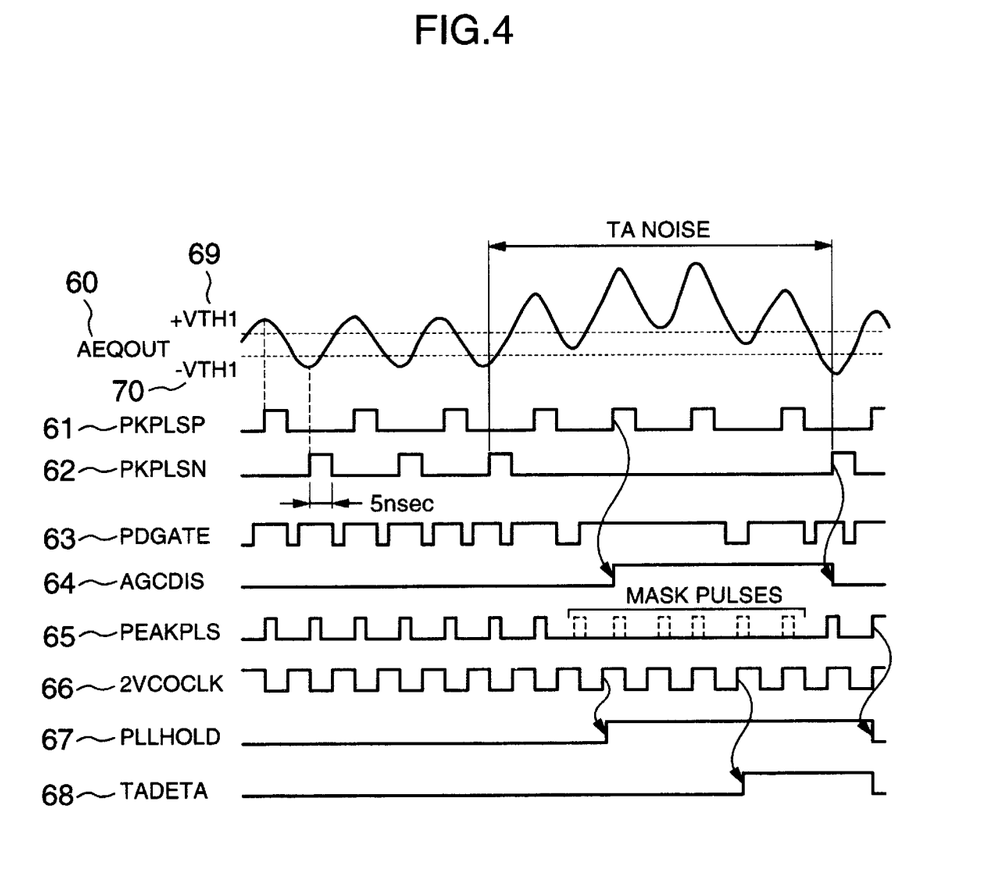
FIG. 4 is a signal timing chart showing an example of operation of a reproduced signal processing circuit arranged in a magnetic disk unit in an embodiment in accordance with the present invention.

FIG. 4 shows in a timing chart at occurrence of thermal asperity in the PLOSYNC signal the output of AEQOUT 60 from the AEQ 212, peak pulses PKPLSP 61 and PKPLSN 62, a level slice result PDGATE 63, a control signal AGC-DIS 64 to control (discharge) the AVGAC 231 to increase the amplitude, a comparison pulse PEAKPLS 65 for the frequency and phase comparison in the AVCOC 221, a clock signal 2VCOCLK 66 obtained by dividing the clock signal of VCO 219 by two, a hold signal PLLHOLD 67 to set the control output from the AVCOC 221 to "no signal", and a TA detection result TADETA 68 of the TASHRT 243 and the TADET 1.

The signals PKPLSP 61 and PKPLSN 62 are respectively outputted on the positive and negative sides of the signal waveform of the AEQOUT 60. Specifically, in a PKPLSP, PKPLSN, and PDGATE generating circuit 341 shown in FIG. 13, a differential zero-crossing signal of the AEQOUT 60 is ANDed with each of the level slice signals obtained for threshold values respectively set to +VHT1 69 and −VHT1 70 (to be set by a register) to resultantly generate PKPLSP 61 and PKPLSN 62. Therefore, when there occurs thermal asperity in which the threshold value on one side (−VHT1 70 in FIG. 4) is greater than the signal in any cases, only the peak pulse on the other side (+VHT1 69 in FIG. 4) is outputted. Additionally, although not shown, when the signal amplitude is decreased by a medium defect and hence neither threshold is exceeded, none of the PKPLSP 61 and PKPLSN 62 is outputted. To generate the signal PDGATE 63, in the PKPLSP, PKPLSN, and PDGATE generating circuit 341 shown in FIG. 13, the signal AEQOUT 60 is level-sliced by the threshold values on the positive and negative sides and then the resultant values are subjected to a logical sum (OR) operation. In consequence, at occurrence of thermal asperity, a period of "H" is elongated in PDGATE 63. Furthermore, although not shown, when the signal amplitude is lowered due to a medium defect and neither threshold value is exceeded, a period of "L" continues for a long period of time in PDGATE 63.

Figure 13:
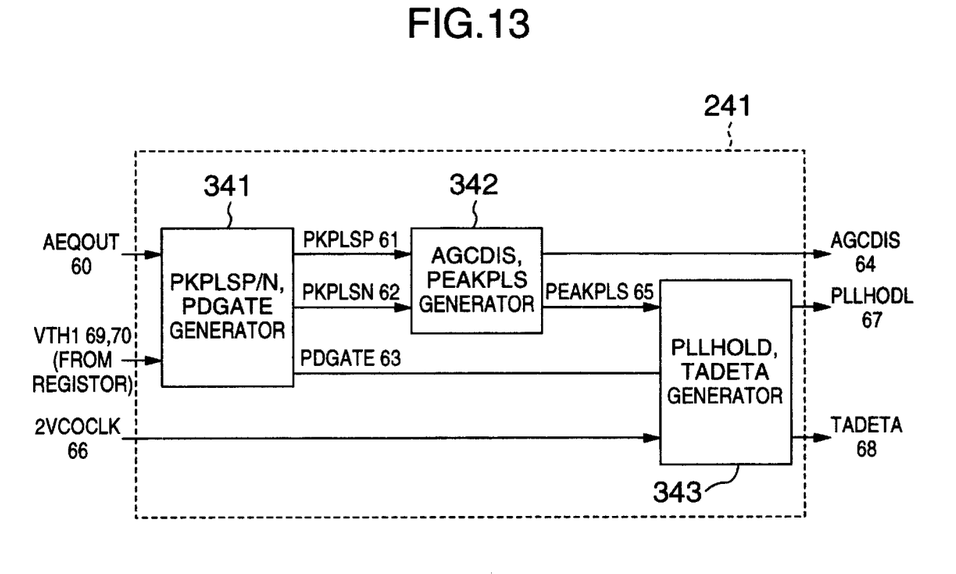
FIG. 13 is a block diagram showing a second TA detecting circuit TADET1 used in the reproduced signal processing circuit of FIG. 1.

In an AGCDIS and PEAKPLS generating circuit 342 shown in FIG. 13, the signal AGCDIS 64 is generated by using the alternating or repetitious appearance of the peak pulse. Specifically, an "H" level is obtained at a rising edge of PKPLSP 61 and the signal is cleared in an "H" period of PKPLSN 62. Alternatively, an "H" level is attained at a rising edge of PKPLSN 62 and the signal is cleared in an "H" period of PKPLSP 61 to detect missing peak pulses for the signal generation. Additionally, although not shown, when the signal amplitude is lowered due to a medium defect and neither threshold value is exceeded, there is outputted a signal similar to that described above, which is almost the same as the normal operation.

The output from PEAKPLS 65 is masked while the alternation of PKPLSP 61 and PKPLSN 62 is being disturbed and the comparison in frequency and phase is achieved in accordance with 2VCOCLK 66.

For PLLHOLD 67, in a PLLHOLD and TADETA generating circuit 343 shown in FIG. 13, a missing pulse of PEAKPLS 65 is detected by 2VCOCLK 66 to output PLLHOLD 67 continuing ant "H" level for a period corresponding to the missing pulse. TADETA 68 is outputted from the generating circuit 343 when K pulses of PEAKPLS 65 (K is an integer equal to or more than two and is four in this embodiment) are successively missing and PDGATE 63 is "H in this state. When the signal amplitudes is lowered due to a medium defect and neither threshold value is exceeded, the signal PDGATE 63 is set to "L" and hence the signal is not outputted.

With provision above, even when the signal amplitude is decreased in the PLOSYNC signal due to thermal asperity and/or a medium defect, it is possible to cause the AGC loop to increase the amplitude and the PLL to suppress the control output, and only in the case of thermal asperity, the cutoff frequency of HPF 210 is increased. This consequently prevents the burst error of data due to the disordered state of the AGC and PLL loops and hence the data can be read without requiring the retry. In addition, when the circuit is operated to output AGCDIS 64 even before the assertion of RG, it is possible to prevent the sector error caused by occurrence of thermal asperity before the assertion of RG. Namely, the AGC loop narrows its gain to reduce the amplitude and hence a long period of time is necessary to restore its original state, and hence the sync byte cannot be detected because the AGC and PLL loops cannot be set to the ordinary state. However, during the servo period, it is necessary to fix the gain of the AGC loop, AGCDIS 64 is masked. In this connection, although the AEQOUT 60 is shown as a single output for simplification of explanation, there is actually used a differential output and hence the circuits to generate PKPLSP 61, PKPLSN 62, and PDGATE 63 are also configured in association with the differential output.

Figure 5:
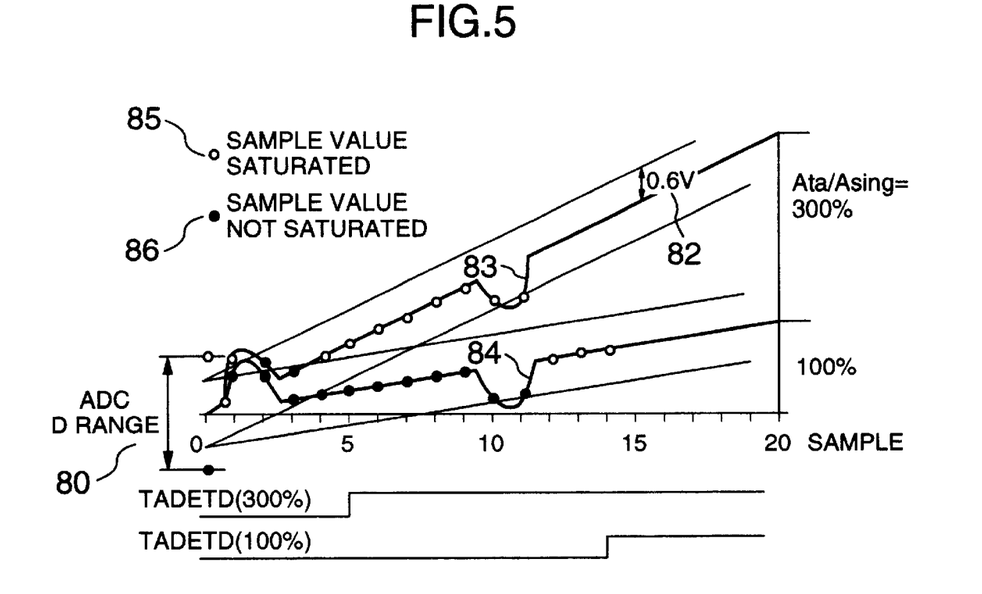
FIG. 5 is a graph showing an example of operation of a reproduced signal processing circuit arranged in a magnetic disk unit in an embodiment in accordance with the present invention.
Figure 6:
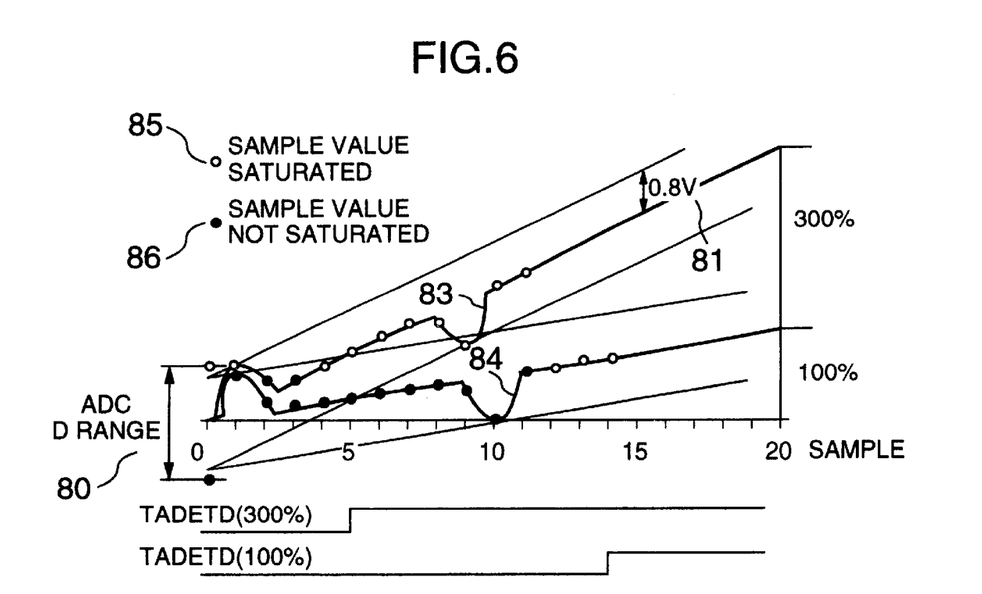
FIG. 6 is a graph showing an example of operation of a reproduced signal processing circuit arranged in a magnetic disk unit in an embodiment in accordance with the present invention.
Figure 14:
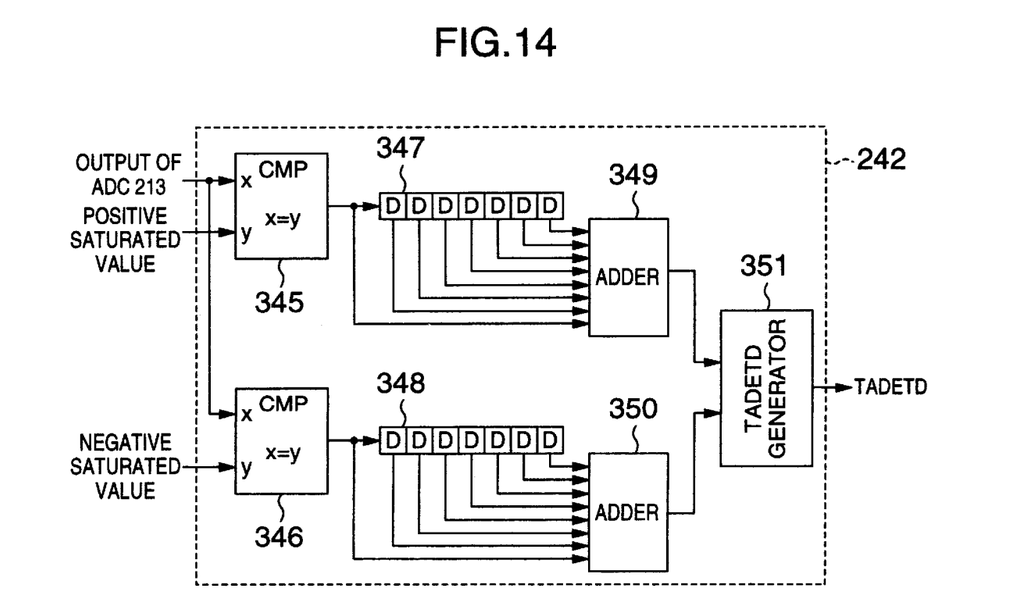
FIG. 14 is a block diagram showing a third TA detecting circuit TADET2 used in the reproduced signal processing circuit of FIG. 1.

Description will now be given of the principle of the TA detecting method in the TADET2 to detect thermal asperity during the operation period of the DVCOC 222. Thermal asperity is detected in accordance with presence or absence of saturation in the output sample from the ADC 213. FIG. 5 shows input waveforms of the ADC 213 and sample values of side samples when thermal asperity occurs in a least-dense pattern ("0" having a run length of 7). Furthermore, FIG. 6 shows input waveforms of the ADC 213 and sample values of peak samples when thermal asperity occurs in a least-dense pattern. When the transfer speed is 200 megabits per second, the rising edge (≈100 ns) develops a maximum amplitude in 20 samples. This graph shows two types of TA waveforms depending on a size (Ata/Asig) thereof, i.e., a waveform 83 with a size of 300% and a waveform 84 with a size of 100%. When the ADC dynamic range 80 is ±1 V and the peak value 81 of the input waveform is ±0.8 V, the side sample values 82 are about ±0.6 V. A sample value 85 indicated by a circle is saturated and a sample value 86 indicated by a solid circle is not saturated. When the detection of thermal asperity is delayed, the change-over of the cut off frequency is delayed for the HPF 210 and hence the amplitude of thermal asperity be comes greater. Therefore, the saturation period is elongated in the ADC 213 and the period in which the AGC and PLL loops are not controlled becomes longer, this leads to an unstable operation. Conversely, at occurrence of the saturation due to a random noise and/or a large input amplitude, when the event is erroneously detected as thermal asperity and the cutoff frequency of the HPF 210 is increased, the low-frequency component is removed from the signal and hence the reproduction performance is deteriorated. To cope with the condition, when at least N samples (N is an integer not less than three) of the same polarity are saturated in M samples (M is an integer not less than eight) and there is missing the saturation with the opposite polarity, thermal asperity is assumed and a result of TA detection (TADETD) is produced. The period of eight samples is checked to detect occurrence of thermal asperity in random data, not only in the least-dense pattern. Thanks to the provision, thermal asperity with a large amplitude (e.g., 300%) can be detected with a high precision at a high speed. Moreover, although a slightly long period of time is required to detect thermal asperity with a small amplitude (e.g., 100%), the signal is originally not saturated in the ADC 213 and hence the detection method can be used without causing any trouble. FIG. 14 shows a block diagram of an internal configuration of the TADET2 242.

In the comparators 345 and 346, the output data from the ADC 213 is respectively compared with a positive saturation value and a negative saturation value, and there is produced "1" when a matching condition results. In this case, the positive and negative saturation values are, for example, "011111" and "100000" when the output from the ADC 213 includes six bits in expression of 2's complement. Shift registers 347 and 348 store therein seven samples of outputs respectively from the comparators 345 and 346. Adders 349 and 350 respectively add the seven samples respectively outputted from the shift registers 347 and 348 to outputs (each including one sample) respectively from the comparators 345 and 346, namely, a total of eight (M) sample are handled for the addition of comparison results. In accordance with the results from the adders 349 and 350, a TADETD generating circuit 351 assumes occurrence of a noise due to thermal asperity and asserts TADETD when either one of the results is equal to or more than three (=N) and the remaining one is "0".

In the embodiment of FIG. 1, the DVCOC 222 sets the control output to "0" (i.e., the control output is invalidated) in response to TASW3 outputted from the TASHRT 243 at detection of thermal asperity. However, it is also possible that the abnormal signal is detected in the DVCOC 222 in accordance with the pattern of input data (outputted from the DEQ 214) to thereby automatically set the control output to "0". A concrete example will be next described. Assuming that input data is expressed as X and an expected value (+1, 0, −1) attained by conducting the hard detection for the input data is denoted as Y, the phase error Z can be derived from the following expression.

$$Z_K + Z_{K-1} = -(X_K - X_{K-2})^* Y_{K-1} + (Y_K - Y_{K-2})^* X_{K-1} \quad (1)$$

Under this condition, by conducting operations as shown in Table 2, it is possible to detect abnormality in a pattern of the input data sequence in accordance with results of hard detection at occurrence of thermal asperity so as to forcibly produce an output signal of "0".

TABLE 2

Examples of operation by the digital VCO control circuit in accordance with the present invention

| $Y_{k-2}$ | $Y_{k-1}$ | $Y_k$ | Expression for operation | Remarks |
|---|---|---|---|---|
| −1 | −1 | −1 | 0 | Abnormal signal |
| −1 | −1 | 0 | $(X_k - X_{k-2}) + X_{k-1}$ | |
| −1 | −1 | +1 | $(X_k - X_{k-2}) + 2X_{k-1}$ | |
| −1 | 0 | −1 | 0 | Abnormal signal |
| −1 | 0 | 0 | $X_{k-1}$ | |
| −1 | 0 | +1 | $2X_{k-1}$ | |
| −1 | +1 | −1 | 0 | Abnormal signal |
| −1 | +1 | 0 | $-(X_k - X_{k-2}) + X_{k-1}$ | |
| −1 | +1 | +1 | $-(X_k - X_{k-2}) + 2X_{k-1}$ | |
| 0 | −1 | −1 | $(X_k - X_{k-2}) - X_{k-1}$ | |
| 0 | −1 | 0 | $(X_k - X_{k-2})$ | |
| 0 | −1 | +1 | $(X_k - X_{k-2}) + X_{k-1}$ | |
| 0 | 0 | −1 | $-X_{k-1}$ | |
| 0 | 0 | 0 | 0 | |
| 0 | 0 | +1 | $X_{k-1}$ | |
| 0 | +1 | −1 | $-(X_k - X_{k-2}) - X_{k-1}$ | |
| 0 | +1 | 0 | $-(X_k - X_{k-2})$ | |
| 0 | +1 | +1 | $-(X_k - X_{k-2}) + X_{k-1}$ | |
| +1 | −1 | −1 | $(X_k - X_{k-2}) - 2X_{k-1}$ | |
| +1 | −1 | 0 | $(X_k - X_{k-2}) - X_{k-1}$ | |
| +1 | −1 | +1 | 0 | Abnormal signal |
| +1 | 0 | −1 | $-2X_{k-1}$ | |
| +1 | 0 | 0 | $-X_{k-1}$ | |
| +1 | 0 | +1 | 0 | Abnormal signal |
| +1 | +1 | −1 | $-(X_k - X_{k-2}) - 2X_{k-1}$ | |
| +1 | +1 | 0 | $-(X_k - X_{k-2}) - X_{k-1}$ | |
| +1 | +1 | +1 | 0 | Abnormal signal |

Furthermore, when the amplitude is lowered due to a medium defect, there is inherently produced the output "0" in accordance with the expression and hence there arises no problem.

As described above, in accordance with the present embodiment, in the reproducing circuit (RSPC 201A) of the magnetic disk unit 10A in which the magnetoresistive head 3 is used as its reproducing head, even when the amplitude is decreased in the data signal region due to thermal asperity and/or a medium defect, it is possible to suppress disturbance in the quantities of control of the AGC and PLL loops, which consequently prevents the burst error in data due to the disturbed operation of the AGC and PLL loops.

Additionally, even when thermal asperity occurs before the read gate is asserted, the VGA 211 does not minimize the gain. Therefore, it is possible to prevent the sector error which is caused because the sync byte cannot be detected due to an insufficient control operation of the AGC and PLL loops.

With provision above, there can be provided a high-performance reproducing circuit (RSPC 201A) and a high-performance magnetic disk unit 10A in which even when the amplitude is decreased due to thermal asperity and/or a medium defect of a magnetic disk 2, the signal can be reproduced on the fly without conducting any retry or the like.

In addition, since the logical sum of the plural TA detection results of TADET0 to TADET2 outputted from the OR circuit 244 are delivered to a desired register or a pin, presence or absence of occurrence of thermal asperity and timing thereof can be correctly recognized by an external device by referring to the logical state of the register or the pin. Consequently, various control operations and improvement of reliability can be achieved for the magnetic disk unit 10A, for example, by increasing the error correction performance, an appropriate execution of read retry, and/or utilization of an alternate sector in response to recognition of the state of the medium defect.

Although the invention of the present inventors has been specifically described in accordance with an embodiment of the invention, it is to be appreciated that the present invention is not restricted by the embodiment and the embodiment can be modified and changed without departing from the range of the present invention.

For example, in the case of the embodiment, the reproduced signal processing technology of the present invention is applied to a reproduce signal processing system of a magnetic disk unit. However, in addition thereto, the reproduced signal processing technology of the present invention can be applied to a pre-stage of a maximum likelihood decoding system in an information communication facility employing the maximum likelihood decoding in the processing of signals received from a desired communication medium.

In accordance with the reproduced signal processing method and the reproduced signal processing apparatus of the present invention, there can be obtained an advantageous effect by a relatively small-sized circuit that the influence of thermal asperity and/or an amplitude reduction can be removed from a reproduced signal onto which a noise due to thermal asperity or the like is superimposed and/or a reproduced signal of which an amplitude is lowered due to a medium defect.

Moreover, in accordance with the reproduced signal processing method and the reproduced signal processing apparatus of the present invention, there can be obtained an advantageous effect that various control operations and improvement in the error correction performance and reliability can be achieved by notifying presence or absence of occurrence of noises and timing thereof to an external device.

In accordance with the magnetic storage unit of the present invention, there can be obtained an advantageous effect by a relatively small-sized circuit that the influence of thermal asperity and/or an amplitude reduction can be removed from a reproduced signal onto which a noise due to thermal asperity or the like is superimposed and/or a reproduced signal of which an amplitude is lowered due to a medium defect.

Furthermore, in accordance with the magnetic storage unit of the present invention, there can be obtained an advantageous effect that various control operations and improvement in the error correction performance and reliability can be achieved by notifying presence or absence of occurrence of noises due to thermal asperity and/or a medium defect and timing thereof to an external device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A reproduced signal processing method for use with a reproduced signal processing circuit, the reproduced signal processing circuit including
   a variable gain amplifier to which a signal read from a medium by a reproducing head is inputted,
   an analog-to-digital converter for converting a signal outputted from the variable gain amplifier into a digital signal, and
   a variable frequency oscillator for supplying an operation clock signal to the analog-to-digital converter, the reproduced signal processing method comprising the steps of:
   operating a first control loop for controlling the variable gain amplifier in accordance with at least either one of the analog reproduced signal according to an output signal from the variable gain amplifier and the digital reproduced signal corresponding to an output signal from the analog-to-digital converter;
   operating at least either one of a second control loop and a third control loop, the second control loop controlling the variable frequency oscillator in accordance with the analog reproduced signal corresponding to an output signal from the variable gain amplifier, the third control loop controlling the variable frequency oscillator in accordance with the digital reproduced signal corresponding to an output signal from the analog-to-digital converter;
   filtering by analog filter means the read signal inputted to the variable gain amplifier, the analog filter means having a cutoff frequency range variable for a signal inputted thereto;
   operating at least one of first, second, and third noise detecting operations, the first noise detecting operation detecting presence or absence of a noise by comparing an amplitude of the output signal from the variable gain amplifier with a predetermined threshold value, the second noise detecting operation detecting a noise during an operation period of the second control loop, the third noise detecting operation detecting a noise during an operation period of the third control loop; and
   changing the range of cutoff frequency of the analog filter means in accordance with a result from at least one of the first, second, and third noise detecting operations, thereby controlling at least one of the first, second, and third control loops.

2. A reproduced signal processing method according to claim 1, wherein the reproducing head is a magnetoresistive head; and
   wherein the reproduced signal processing method further comprises the step of controlling, when a thermal asperity noise is detected by any one of the first, second, and third noise detecting operations, the cutoff frequency of the analog filter means to selectively change between a frequency substantially equal to 0.01×Nyquist frequency in the sampling of the reproduced signal and a frequency substantially equal to at least 0.05×Nyquist frequency in the sampling of the reproduced signal.

3. A reproduced signal processing method according to claim 1, wherein the second noise detecting operation includes the steps of:
   reading a positive threshold value and a negative threshold value from registers for decision of presence or absence of a noise in the analog reproduced signal; and
   determining occurrence of a noise when a preamble in the reproduced signal does not keep a predetermined cycle for a period of K or more samples (K is a positive integer equal to or more than two) and a result of a level-slicing of the analog reproduced signal by the threshold values includes a value of only either one of the polarities.

4. A reproduced signal processing method according to claim 1, wherein the third noise detecting operation includes the step of determining occurrence of a noise when an output signal from the analog-to-digital converter during an operation period of the third control loop is saturated in N or more samples (N is a positive integer equal to or more than two) with either one of the polarities among M samples (M is a positive integer equal to or more than two) and no saturation is detected with the other one of the polarities.

5. A reproduced signal processing method according to claim 1, further comprising the step of controlling a gain of the variable gain amplifier to be increased when a response characteristic of the first control loop is set such that an operation to bring an amplitude of the analog reproduced signal close down to the target value takes precedence over an operation to bring an amplitude of the analog reproduced signal close up to the target value and a result of a level-slicing by the second noise detecting operation of the analog reproduced signal by two predetermined threshold values includes a value of only either one of the polarities in a period other than an operation period of the third control loop.

6. A reproduced signal processing method according to claim 1, further comprising the steps of:

detecting, by a hard detection, presence or absence of a particular abnormal pattern in the digital reproduced signal; and invalidating a control output from the third control loop when the particular abnormal pattern is detected.

7. A reproduced signal processing method according to claim 1, further comprising the steps of:

conducting a logical sum operation for results from the first, second, and third noise detecting operations; and outputting an operation result of the logical sum operation to an external device.

8. A reproduced signal processing circuit comprising:

a variable gain amplifier to which a signal read from a desired medium by a reproducing head is inputted;

an analog-to-digital converter for converting a signal outputted from the variable gain amplifier into a digital signal;

a variable frequency oscillator for supplying an operation clock signal to the analog-to-digital converter;

a first control circuit for controlling the variable gain amplifier in accordance with at least either one of the analog reproduced signal corresponding to an output signal from the variable gain amplifier and the digital reproduced signal corresponding to an output signal from the analog-to-digital converter;

at least either one of a second control circuit and a third control circuit, the second control circuit controlling the variable frequency oscillator in accordance with the analog reproduced signal corresponding to an output signal from the variable gain amplifier, the third control circuit controlling the variable frequency oscillator in accordance with the digital reproduced signal corresponding to an output signal from the analog-to-digital converter;

analog filter means disposed in a stage before the variable gain amplifier, the means having a cutoff frequency range variable for a signal inputted thereto;

at least one of first, second, and third noise detecting means, the first noise detecting means detecting presence or absence of a noise by comparing an amplitude of the output signal from the variable gain amplifier with a predetermined threshold value, the second noise detecting means detecting a noise during an operation period of the second control circuit, the third noise detecting means detecting a noise during an operation period of the third control circuit; and means for changing the range of cutoff frequency of the analog filter means in accordance with a noise detection result from at least one of the first, second, and third noise detecting means, thereby controlling at least one of the first, second, and third control circuits.

9. A reproduced signal processing circuit according to claim 8, wherein the reproducing head is a magnetoresistive head; and wherein the control means controls, when a thermal asperity noise is detected by either one of the first, second, and third noise detecting means, the cutoff frequency of the analog filter means to selectively change between a frequency substantially equal to 0.01×Nyquist frequency in the sampling of the reproduced signal and a frequency substantially equal to at least 0.05×Nyquist frequency in the sampling of the reproduced signal.

10. A reproduced signal processing circuit according to claim 8, wherein the first noise detecting means includes a first register for storing therein the predetermined threshold value;

wherein the second noise detecting means includes a second register for storing therein a threshold value for decision of presence or absence of a noise in the analog reproduced signal; and wherein the first and second registers are independent of each other.

11. A reproduced signal processing circuit according to claim 8, wherein the second noise detecting means includes a second register for storing therein a threshold value for decision of presence or absence of a noise in the analog reproduced signal; and wherein the second noise detecting means determines occurrence of a noise when a preamble in the reproduced signal does not keep a predetermined cycle for a period of K or more samples (K is a positive integer equal to or more than two) and a result of a level-slicing of the analog reproduced signal by the threshold values includes a value of only either one of the polarities.

12. A reproduced signal processing circuit according to claim 11, wherein the second noise detecting means determines occurrence of a thermal asperity noise in a case of K≧4.

13. A reproduced signal processing circuit according to claim 8, wherein the third noise detecting means determines occurrence of a noise when an output signal from the analog-to-digital converter during an operation period of the third control circuit is saturated in N or more samples (N is a positive integer equal to or more than two) with either one of the polarities among M samples (M is a positive integer equal to or more than two) and no saturation is detected with the other one of the polarities.

14. A reproduced signal processing circuit according to claim 13, wherein the third noise detecting means determines occurrence of a thermal asperity noise in a case of N≧3 and M=8.

15. A reproduced signal processing circuit according to claim 8, further comprising means for controlling a gain of the variable gain amplifier to be increased when a response characteristic of the first control circuit is set such that an operation to bring an amplitude of the analog reproduced signal close down to the target value takes precedence over an operation to bring an amplitude of the analog reproduced signal close up to the target value and a result of a level-slicing by the second noise detecting means of the analog reproduced signal by two predetermined threshold values includes a value of only either one of the polarities in a period other than an operation period of the third control circuit.

16. A reproduced signal processing circuit according to claim 8, wherein the third control circuit includes abnormal signal detecting means for detecting, by a hard detection, presence or absence of a particular abnormal pattern in the digital reproduced signal, and invalidating a control output from the third control circuit when the particular abnormal pattern is detected.

17. A reproduced signal processing circuit according to claim 8, further comprising:

means for conducting a logical sum operation for results from the first, second, and third noise detecting operations; and either one of a register for keeping a result of the logical sum operation therein and a terminal for outputting the operation result to an external device.

18. A magnetic storage apparatus comprising:

a magnetic storage medium;

a reproducing head for reading information from the magnetic storage medium; and a reproduced signal processing circuit coupled with the reproducing head, the reproduced signal processing circuit including:

a variable gain amplifier for controlling an amplitude of a read signal supplied from the reproducing head thereto;

an analog-to-digital converter for converting a reproduced signal outputted from the variable gain amplifier into a digital signal;

a variable frequency oscillator for generating a sampling clock signal of the analog-to-digital converter;

a first control loop for bringing in accordance with at least either one of the analog reproduced signal corresponding to an output signal from the variable gain amplifier and the digital reproduced signal corresponding to an output signal from the analog-to-digital converter an amplitude of the analog reproduced signal close to a desired target value;

at least either one of a second control loop and a third control loop, the second control loop bringing a phase of a sampling clock signal of the variable frequency oscillator to a target phase in accordance with the analog reproduced signal corresponding to an output signal from the variable gain amplifier, the third control loop bringing a phase of a sampling clock signal of the variable frequency oscillator to a target phase in accordance with the digital reproduced signal corresponding to an output signal from the analog-to-digital converter;

at least one of first, second, and third noise detecting means, the first noise detecting means detecting presence or absence of a noise by comparing an amplitude of an output signal from the variable gain amplifier with a predetermined threshold value, the second noise detecting means detecting a noise during an operation period of the second control loop, the third noise detecting means detecting a noise during an operation period of the third control loop;

analog filter means disposed in a stage before the variable gain amplifier, the means having a cutoff frequency range variable for changing a signal inputted thereto; and control means for changing, in accordance with a noise detection result from at least one of the first, second, and third noise detecting means, a cutoff frequency range of a high-pass characteristic of the analog filter means for a data region of the reproduced signal at a desired rate with respect to a Nyquist frequency in the sampling of the reproduced signal.

19. A magnetic storage apparatus according to claim 18, wherein the reproducing head is a magnetoresistive head; and wherein the control means controls, when a thermal asperity noise is detected by either one of the first, second, and third noise detecting means, the cutoff frequency of the analog filter means to selectively change between a frequency substantially equal to 0.01×Nyquist frequency in the sampling of the reproduced signal and a frequency substantially equal to at least 0.05×Nyquist frequency in the sampling of the reproduced signal.

20. A magnetic storage apparatus according to claim 18, wherein the first noise detecting means includes a first register for storing therein the predetermined threshold value;

wherein the second noise detecting means includes a second register for storing therein a threshold value for decision of presence or absence of a noise in the analog reproduced signal; and wherein the first and second registers are independent of each other.

21. A magnetic storage apparatus according to claim 18, wherein the second noise detecting means includes a second register for storing therein a threshold value for decision of presence or absence of a noise in the analog reproduced signal; and wherein the second noise detecting means determines occurrence of a noise when a preamble in the reproduced signal does not keep a predetermined cycle for a period of K or more samples (K is a positive integer equal to or more than two) and a result of a level-slicing of the analog reproduced signal by the threshold values includes a value of only either one of the polarities.

22. A magnetic storage apparatus according to claim 21, wherein the second noise detecting means determines occurrence of a thermal asperity noise in a case of $K \geq 4$.

23. A magnetic storage apparatus according to claim 18, wherein the third noise detecting means determines occurrence of a noise when an output signal from the analog-to-digital converter during an operation period of the third control loop is saturated in N or more samples (N is a positive integer equal to or more than two) with either one of the polarities among M samples (M is a positive integer equal to or more than two) and no saturation is detected with the other one of the polarities.

24. A magnetic storage apparatus according to claim 23, wherein the third noise detecting means determines occurrence of a thermal asperity noise in a case of $N \geq 3$ and M=8.

25. A magnetic storage apparatus according to claim 18, wherein the reproduced signal processing circuit further includes means for controlling a gain of the variable gain amplifier to be increased when a response characteristic of the first control loop is set such that an operation to bring an amplitude of the analog reproduced signal close down to the target value takes precedence over an operation to bring an amplitude of the analog reproduced signal close up to the target value and a result of a level-slicing by the second noise detecting means of the analog reproduced signal by two predetermined threshold values includes a value of only either one of the polarities in a period other than an operation period of the third control loop.

26. A magnetic storage apparatus according to claim 18, wherein the third control loop includes abnormal signal detecting means for detecting, by a hard detection, presence or absence of a particular abnormal pattern in the digital reproduced signal, and invalidating a control output from the third control loop when the particular abnormal pattern is detected.

27. A magnetic storage apparatus according to claim 18, wherein the reproduced signal processing circuit further includes:

means for conducting a logical sum operation for results from the first, second, and third noise detecting means; and either one of a register for keeping a result of the logical sum operation therein and a terminal for outputting the operation result to an external device.

\* \* \* \* \*